United States Patent
Zhu et al.

(10) Patent No.: US 12,425,148 B2
(45) Date of Patent: Sep. 23, 2025

(54) DATA TRANSMISSIONS USING MULTIPLE TRANSMISSION RECEPTION POINTS

(71) Applicant: LENOVO (BEIJING) LIMITED, Beijing (CN)

(72) Inventors: Chenxi Zhu, Fairfax, VA (US); Bingchao Liu, Beijing (CN); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 330 days.

(21) Appl. No.: 17/910,947

(22) PCT Filed: Mar. 12, 2020

(86) PCT No.: PCT/CN2020/078940
§ 371 (c)(1),
(2) Date: Sep. 12, 2022

(87) PCT Pub. No.: WO2021/179238
PCT Pub. Date: Sep. 16, 2021

(65) Prior Publication Data
US 2023/0058765 A1 Feb. 23, 2023

(51) Int. Cl.
*H04L 5/00* (2006.01)
*H04W 72/04* (2023.01)
*H04W 72/23* (2023.01)

(52) U.S. Cl.
CPC .......... *H04L 5/0035* (2013.01); *H04L 5/0051* (2013.01); *H04W 72/23* (2023.01)

(58) Field of Classification Search
CPC ... H04L 5/0035; H04L 5/0023; H04L 5/0051; H04L 5/0044; H04L 5/0053;
(Continued)

(56) References Cited

U.S. PATENT DOCUMENTS 11,025,384 B2 * 6/2021 Manolakos ........... H04L 5/0048
11,909,526 B2 * 2/2024 Yuan ..................... H04B 7/022
(Continued)

FOREIGN PATENT DOCUMENTS

CN 104125186 A 10/2014
WO 2019193666 A1 10/2019

OTHER PUBLICATIONS

International Searching Authority, "Written Opinion of the International Searching Authority," PCT/CN2020/078940, Dec. 7, 2020, pp. 1-4.
(Continued)

*Primary Examiner* — Rasheed Gidado
(74) *Attorney, Agent, or Firm* — Kunzler Bean & Adamson

(57) ABSTRACT

Apparatuses, methods, and systems are disclosed for data transmissions using multiple transmission reception points. One method (600) includes transmitting (602) a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel. The method (600) includes transmitting (604) the downlink data channel from two transmission reception points, wherein each transmission reception point of the two transmission reception points transmits each data layer of one or more data layers and a demodulation reference signal associated with each data layer.

9 Claims, 7 Drawing Sheets

(58) Field of Classification Search
CPC .. H04L 5/0091; H04L 5/0094; H04W 72/042; H04W 72/20; H04W 72/23
See application file for complete search history.

(56) References Cited

U.S. PATENT DOCUMENTS

| | | |
|---|---|---|
| 2014/0254542 A1 | 9/2014 | Liu et al. |
| 2016/0308654 A1 | 10/2016 | Kim et al. |
| 2017/0288839 A1 | 10/2017 | Nogami et al. |
| 2020/0045700 A1* | 2/2020 | Sun ................ H04L 5/0091 |
| 2020/0076648 A1* | 3/2020 | Li .................. H04B 7/0404 |
| 2020/0229156 A1* | 7/2020 | Park ................ H04L 5/0051 |
| 2021/0337584 A1* | 10/2021 | Zhang .............. H04L 5/0051 |
| 2022/0124768 A1* | 4/2022 | Frenne ............. H04L 1/1819 |

OTHER PUBLICATIONS

Samsung, Mac Running CR for NR eMIMO, 3GPP TSG-RAN2 Meeting #108, R2-1915254, Nov. 18-22, 2019. pp. 1-73, Reno, USA.

PCT/CN2020/078940, "Supplementary European Search Report", European Patent Office, Nov. 8, 2023, pp. 1-13.
Huawei et al., "Summary of AI: 7.2.8.2 Enhancements on Multi-TRP/Panel Transmission of Offline Discussion", 3GPP TSG RAN WG1 Meeting #97 R1-1907706, May 13-17, 2019, pp. 1-66.
Huawei et al., "Evaluation of potential BS based solution for improving the downlink performance under the identified SFN scenario", 3GPP TSG-RAN WG4 Meeting #76bis R4-155658, Oct. 12-16, 2015, pp. 1-3.
Huawei et al., "Enhance UE performance under SFN scenario", 3GPP TSG-RAN WG4 Meeting #77 R4-157700, Oct. 16-20, 2015, pp. 1-5.
Intel Corporation, "TP: High speed train for SFN scenario", 3GPP TSG-RAN WG4 Meeting #77 R4-158182, Oct. 16-20, 2015, pp. 1-3.
Samsung, "New WID: Further enhancements on MIMO for NR", 3GPP TSG RAN Meeting #86 RP-193133, Dec. 9-12, 2019, pp. 1-5.
3GPP, "3rd Generation Partnership Project; Technical Specification Group Radio Access Network; Study on performance enhancements for high speed scenario in LTE (Release 13)", 3GPP TR 36.878 V13.0.0, Jan. 2016, pp. 1-92.

* cited by examiner

DATA TRANSMISSIONS USING MULTIPLE TRANSMISSION RECEPTION POINTS

FIELD

The subject matter disclosed herein relates generally to wireless communications and more particularly relates to data transmissions using multiple transmission reception points.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Receive ("RX"), Single Carrier Frequency Domain Spread Spectrum ("SC-FDSS"), Secondary Cell ("SCell"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Temporary Mobile Subscriber Identity ("TMSI"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, UEs may travel at high speeds.

BRIEF SUMMARY

Methods for data transmissions using multiple transmission reception points are disclosed. Apparatuses and systems also perform the functions of the methods. In one embodiment, the method includes transmitting a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel. In certain embodiments, the method includes transmitting the downlink data channel from two transmission reception points, wherein each transmission reception point of the two transmission reception points transmits each data layer of one or more data layers and a demodulation reference signal associated with each data layer.

An apparatus for data transmissions using multiple transmission reception points, in one embodiment, includes a transmitter that: transmits a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and transmits the downlink data channel from two transmission reception points, wherein each transmission reception point of the two transmission reception points transmits each data layer of one or more data layers and a demodulation reference signal associated with each data layer.

A method for data transmissions using multiple transmission reception points includes receiving a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel. In some embodiments, the method includes receiving the downlink data channel, wherein each data layer of one or more data layers and a demodulation reference signal associated with each data layer is associated with the two transmission configuration indication states.

An apparatus for data transmissions using multiple transmission reception points, in one embodiment, includes a receiver that: receives a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and receives the downlink data channel, wherein each data layer of one or more data layers and a demodulation reference signal associated with each data layer is associated with the two transmission configuration indication states.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
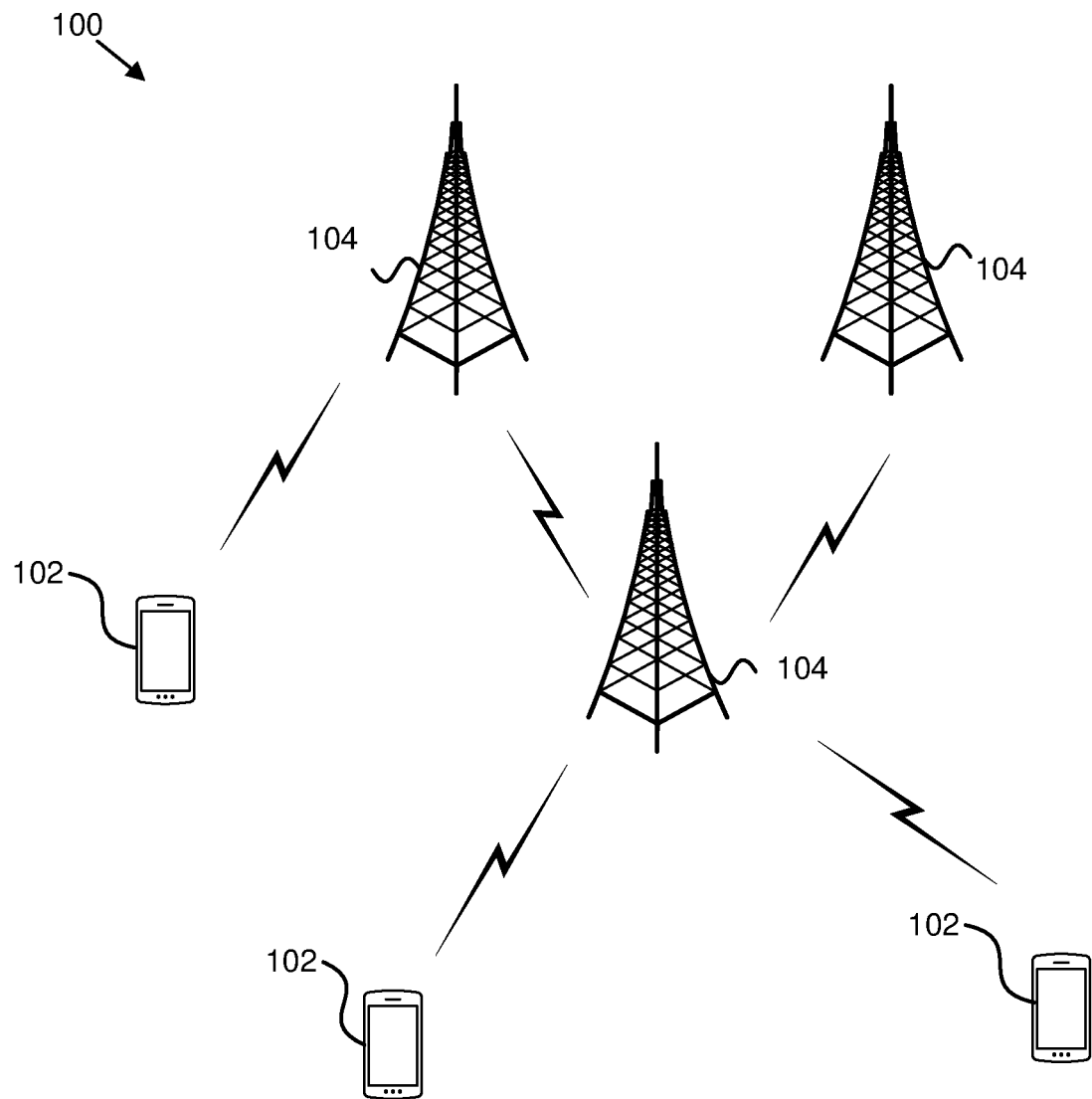
FIG. 1 is a schematic block diagram illustrating one embodiment of a wireless communication system for data transmissions using multiple transmission reception points.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for data transmissions using multiple transmission reception points. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a network unit 104 may transmit a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel. In certain embodiments, the network unit 104 may transmit the downlink data channel from two transmission reception points, wherein each transmission reception point of the two transmission reception points transmits each data layer of one or more data layers and a demodulation reference signal associated with each data layer. Accordingly, a network unit 104 may be used for data transmissions using multiple transmission reception points.

In various embodiments, a remote unit 102 may receive a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel. In some embodiments, the remote unit 102 may receive the downlink data channel, wherein each data layer of one or more data layers and a demodulation reference signal associated with each data layer is associated with the two transmission configuration indication states. Accordingly, a remote unit 102 may be used for data transmissions using multiple transmission reception points.

Figure 2:
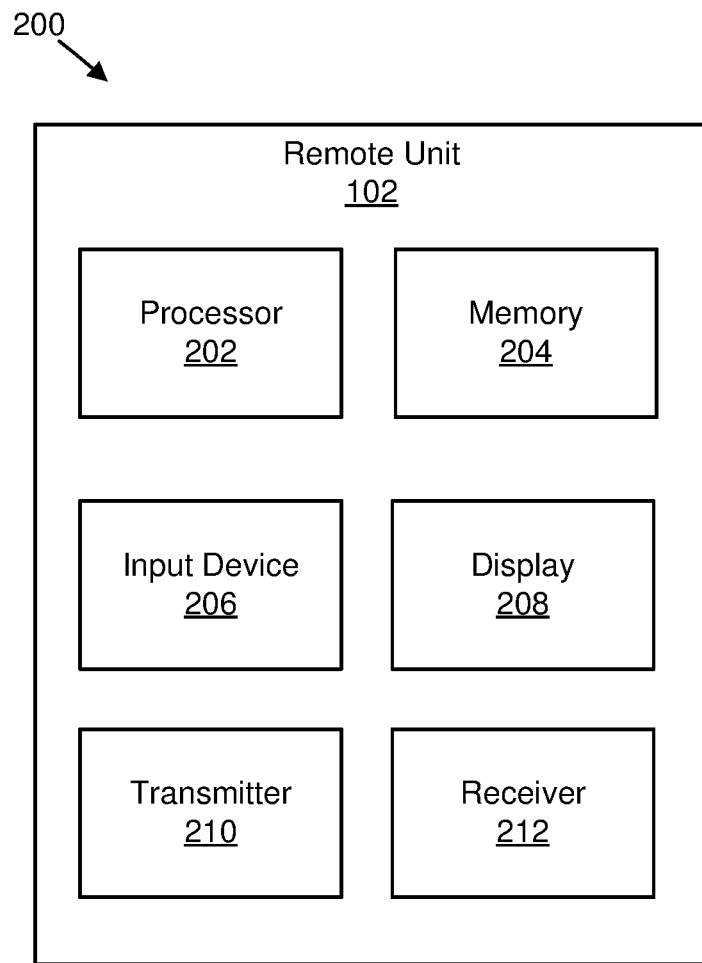
FIG. 2 is a schematic block diagram illustrating one embodiment of an apparatus that may be used for data transmissions using multiple transmission reception points.

FIG. 2 depicts one embodiment of an apparatus 200 that may be used for data transmissions using multiple transmission reception points. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 may: receive a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and receive the downlink data channel, wherein each data layer of one or more data layers and a demodulation reference signal associated with each data layer is associated with the two transmission configuration indication states. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
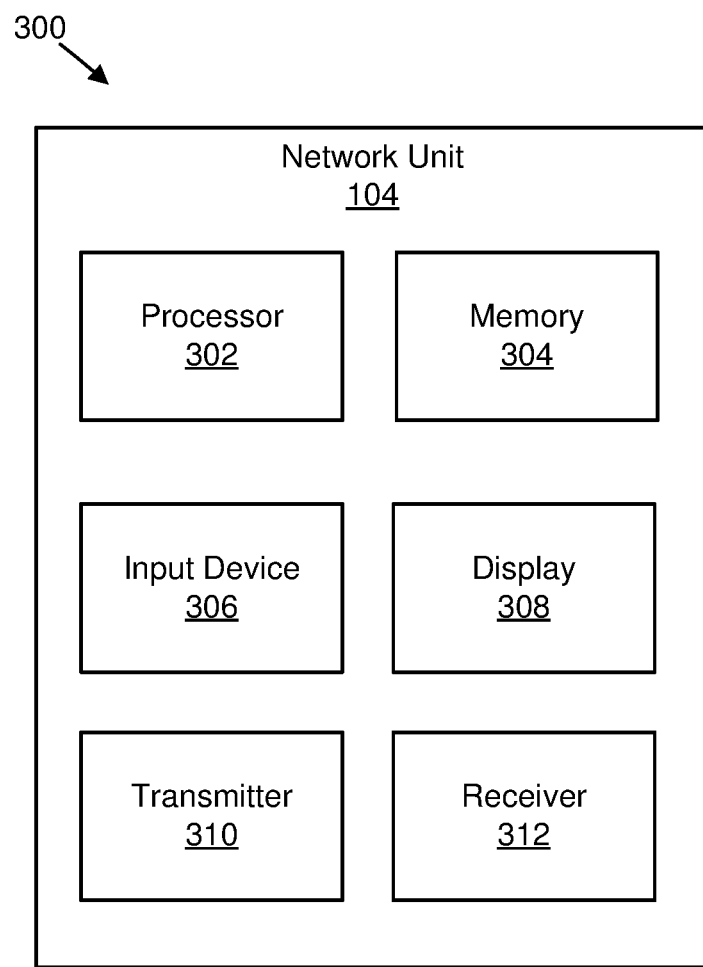
FIG. 3 is a schematic block diagram illustrating one embodiment of an apparatus that may be used for data transmissions using multiple transmission reception points.

FIG. 3 depicts one embodiment of an apparatus 300 that may be used for data transmissions using multiple transmission reception points. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may: transmit a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and transmit the downlink data channel from two transmission reception points, wherein each transmission reception point of the two transmission reception points transmits each data layer of one or more data layers and a demodulation reference signal associated with each data layer. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, systems with high speed trains may have a single frequency network deployment.

Figure 4:
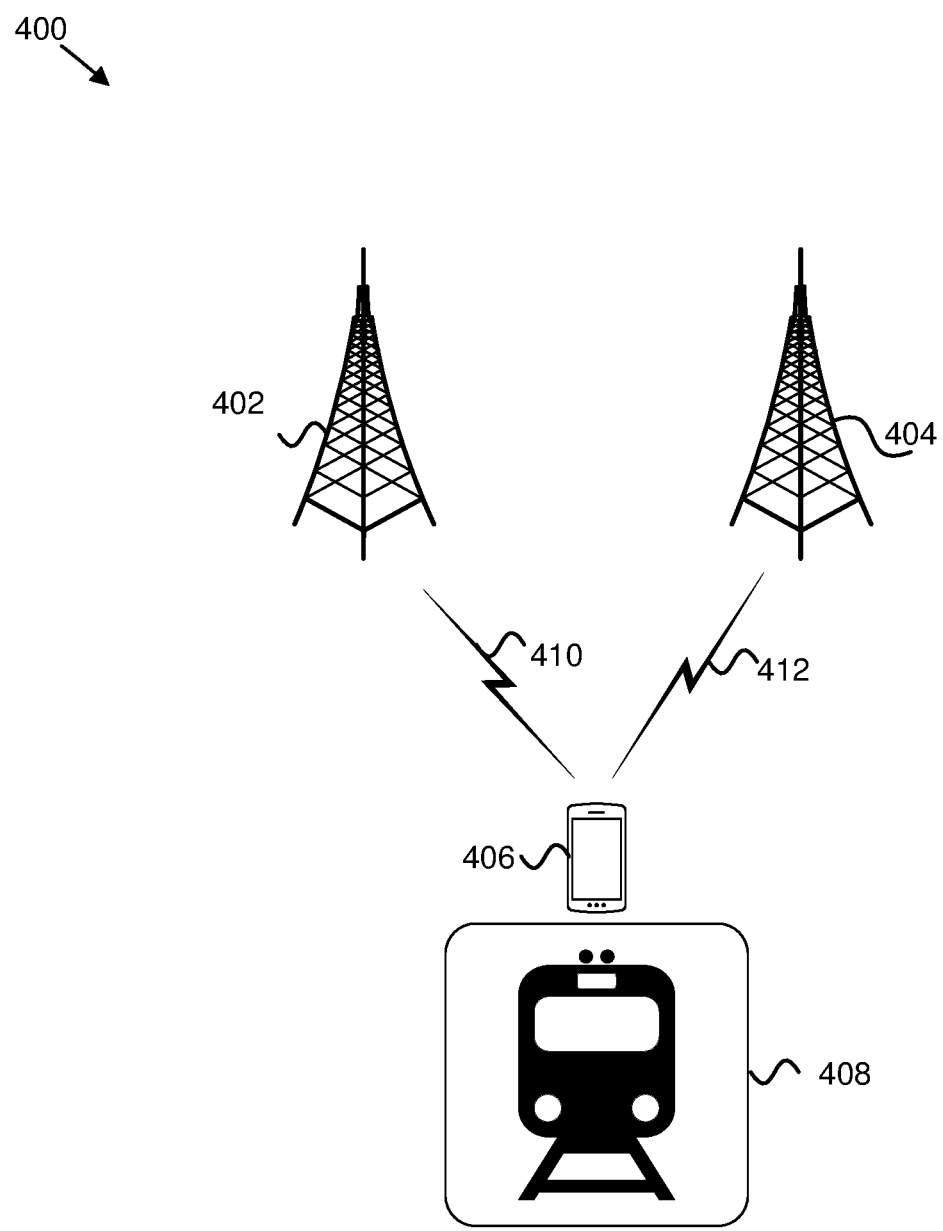
FIG. 4 is a schematic block diagram illustrating one embodiment of a system including communications with a UE traveling at high speeds.

FIG. 4 is a schematic block diagram illustrating one embodiment of a system 400 including communications with a UE traveling at high speeds. The system 400 (e.g., a cell) includes a first RRH 402 (e.g., TRP) and a second RRH 404 (e.g., TRP) that communicate with a UE 406 in a high speed vehicle 408 (e.g., train). The first RRH 402 and the second RRH 404 are deployed along a path (e.g., railway line) on which the high speed vehicle 408 travels. In some embodiments, the first RRH 402 and the second RRH 404 share the same cell ID. In various embodiments, the first RRH 402 and the second RRH 404 are connected to a gNB with an ideal backhaul and may jointly transmit DL data to the UE 406 in PDSCH. Specifically, the first RRH 402 uses a first communication channel 410 (e.g., one or more communication channels) and the second RRH 404 uses a second communication channel 412 (e.g., one or more communication channels).

In certain embodiments, each cell has two adjacent RRHs; while, in other embodiments, each cell may have greater than or less than two adjacent RRHs. In some embodiments, RRHs may use omnidirectional antennas. As may be appreciated, because of the high speed of the UE 406 in the high speed vehicle 408, a large Doppler shift may be observed. For example, the second RRH 404 in front of the UE 406 may have a positive Doppler shift and the first RRH 402 behind the UE 406 may have a negative Doppler shift. In various embodiments, the first communication channel 410 may operate with a frequency of $F_C+F_D^1$, while the second communication channel 412 may operate with a frequency of $F_C+F_D^2$. $F_C$ may refer to a cell frequency, $F_D^1$ may refer to a first Doppler frequency shift, and $F_D^2$ may refer to a second Doppler frequency shift. Because of a distance between an RRH and a path, and because of a position of the UE 406, $F_D^1$ (e.g., <0) and $F_D^2$ (e.g., >0) may not necessarily have the same amplitude.

Figure 5:
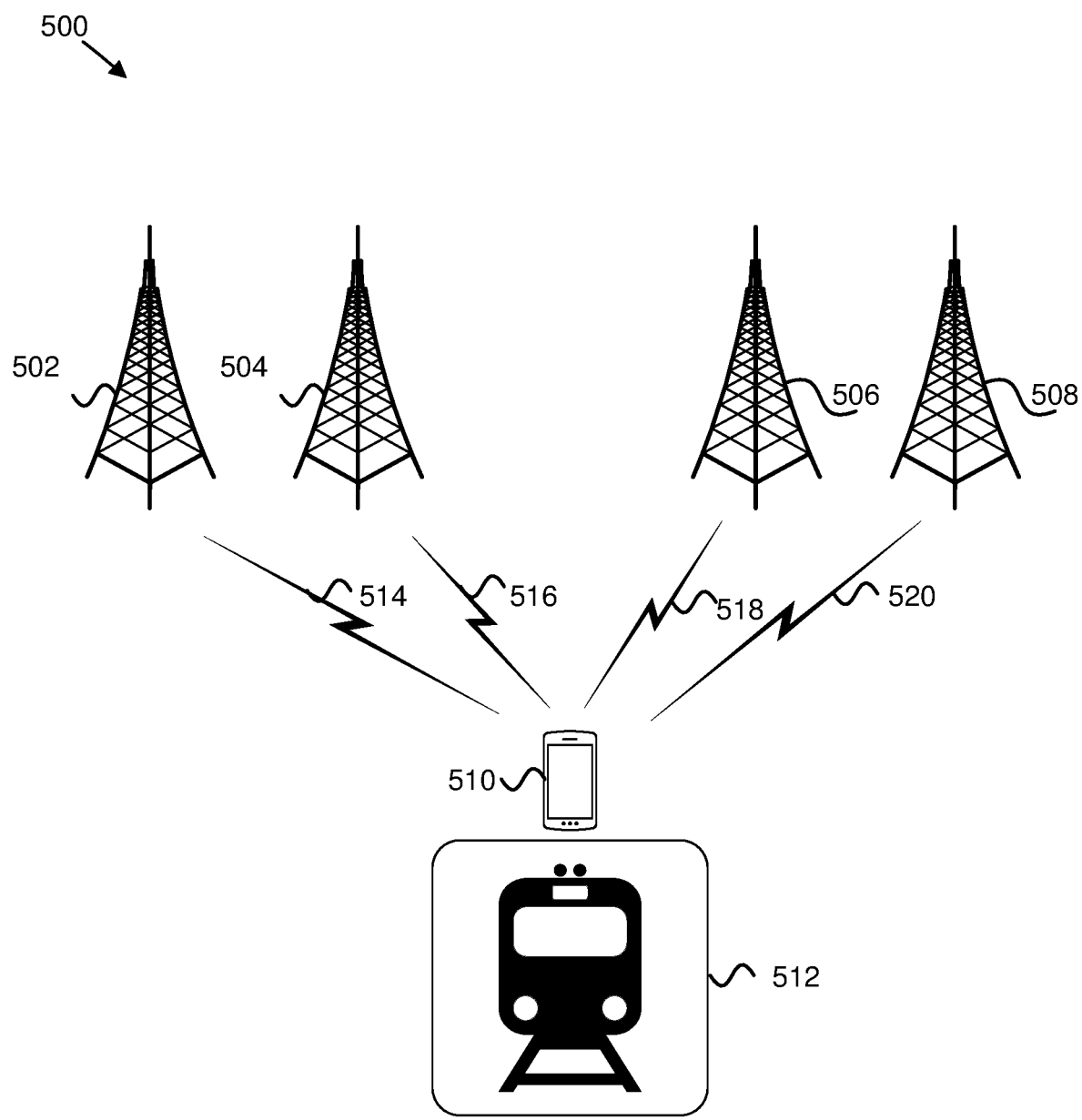
FIG. 5 is a schematic block diagram illustrating another embodiment of a system including communications with a UE traveling at high speeds.

FIG. 5 is a schematic block diagram illustrating another embodiment of a system 500 including communications with a UE traveling at high speeds. The system 500 (e.g., a cell) includes a first RRH 502 (e.g., TRP), a second RRH 504 (e.g., TRP), a third RRH 506 (e.g., TRP), and a fourth RRH 508 (e.g., TRP) that communicate with a UE 510 in a high speed vehicle 512 (e.g., train). The first RRH 502, the second RRH 504, the third RRH 506, and the fourth RRH 508 are deployed along a path (e.g., railway line) on which the high speed vehicle 512 travels. The first RRH 502 uses a first communication channel 514 (e.g., one or more communication channels) to transmit CSI-RS (e.g., CSI-RS1) in a first CSI-RS resource, the second RRH 504 uses a second communication channel 516 (e.g., one or more communication channels) to transmit CSI-RS (e.g., CSI-RS2) in a second CSI-RS resource, the third RRH 506 uses a third communication channel 518 (e.g., one or more communication channels) to transmit CSI-RS (e.g., CSI-RS3) in a third CSI-RS resource, and the fourth RRH 508 uses a fourth communication channel 520 (e.g., one or more communication channels) to transmit CSI-RS (e.g., CSI-RS4) in a fourth CSI-RS resource. The different RRHs transmit different CSI-RS in different CSI-RS resources. Different CSI-RS resources are configured for different RRHs. By separating CSI-RS signals from different RRHs in a time domain and/or frequency domain, the UE 510 may distinguish between different DL signals from different RRHs with different Doppler shifts and may estimate a channel having a respective Doppler shift and/or a Doppler spread.

In some embodiments, transmission of PDSCH may be done through pairs of adjacent RRHs. For example, for an RRH pair including the first RRH 502 and the second RRH 504, the first RRH 502 is configured to transmit CSI-RS in a first CSI-RS resource and the second RRH 504 is configured to transmit CSI-RS in a second CSI-RS resource. From the first and second CSI-RS resources, the UE 510 may estimate a channel with Doppler shift from each RRH. Because each CSI-RS is subject to a single Doppler shift, no complicated channel estimation algorithm is needed. PDSCH may be transmitted from two adjacent RRHs to the UE 510 using various transmissions schemes, such as using a first transmission scheme (e.g., SFN from two RRHs in all layers of data (e.g., transmission rank)) described in relation to a first embodiment, and a second transmission scheme (e.g., SDM transmissions from two RRHs) described in relation to a second embodiment.

In the first embodiment, all layers in PDSCH are transmitted jointly from both RRHs in a pair of RRHs. This may enable a strength of each layer to not vary significantly as the UE 510 moves from between the two RRHs (e.g., moving from the first RRH 502 (back RRH) toward the second RRH 504 (front RRH)). In the first embodiment, a DMRS of each layer is associated with two CSI-RS resources for a QCL assumption (e.g., the two CSI-RS resources are QCL). In certain configurations of the first embodiment: 1) each PDSCH layer is transmitted by two RRHs (e.g., a pair of adjacent RRHs); 2) PDSCH is transmitted by the two RRHs sharing the same DMRS ports (e.g., the same DMRS port number); 3) each DMRS port of each layer is associated with two CSI-RS resources (DMRS ports are in one or two CDM groups, depending on the number of DMRS ports); and/or 4) a TCI field in DCI format 1_1 indicates two TCI states, each of which is associated with a CSI-RS resource as QCL type A or D (e.g., QCL type A may correspond to {Doppler shift, Doppler spread, average delay, delay spread}—there may be a QCL correspondence between Doppler shift, Doppler spread, average delay, and delay spread, while QCL type D may correspond to {spatial RX parameter}—there may be a QCL correspondence for the spatial RX parameter) and both TCI states are mapped to the same set of DMRS ports.

In the second embodiment, each layer in PDSCH is transmitted from only one RRH. This may enable the UE 510 to separate a signal from different RRHs with different Doppler shift in a spatial domain. In certain configurations of the second embodiment: 1) each PDSCH layer is transmitted by one of two adjacent RRHs, where all the layers transmitted from an RRH (e.g., TRP) are in a same CDM group or groups; 2) DMRS ports transmitted from an RRH are associated with one CSI-RS resource or two CSI-RS resources with different QCL type; and/or 3) a TCI field in DCI format 1_1 indicates two TCI states, each of which is associated with a CSI-RS resource as QCL type A or D.

In various embodiments, the UE 510 is configured with multiple CSI report configurations. In such embodiments, each CSI report configuration may have two CSI-RS resources for channel measurement transmitted from a pair of adjacent RRHs. Because of a high speed of the UE 510, the CSI-RS resources in a CSI-ReportConfig may be updated via a MAC CE. Based on these two CSI-RS resources for channel measurement, the UE 510 may compute CSI feedback as follows: {RI, PMI1, PMI2, CQI} for the first embodiment; or {RI1, RI2, PMI1, PMI2, CQI}, or {RI, PMI1, PMI2, CQI} for the second embodiment. RI1 and PMI1 are for a first configured CSI-RS resource, and RI2 and PMI2 are for a second configured CSI-RS resource. If only one RI is included in the CSI feedback, it applies to both CSI-RS resources (RI1=RI2=RI). RI1, RI2, PMI1, PMI2, and CQI are derived jointly from the two CSI-RS resources. If the total rank from two RRHs ($RI_{total}$=RI for the first embodiment, and $RI_{total}$=RI1+RI2 or 2*RI for the second embodiment) is larger than 4, two CQIs may be computed, one for each codeword. For the first embodiment and the second embodiment, if computing CSI feedback, the UE 510 may choose RI, PMI, and CQI to maximize a total PDSCH capacity.

In such embodiments: A) one or more pairs of NZP CSI-RS resources may be configured in CSI-ReportConfig for channel measurement for which: {1) a pair of NZP CSI-RS resources for channel measurement may be identified by a first CSI-RS resource ID if they are arranged as an ordered pair (CSI-RS1, CSI-RS2), or may be identified by a separate index for an unordered pair (an ID for a CSI-RS resource pair may be used in the place of CRI in CSI feedback); 2) for a zero power CSI-IM resource configured for interference measurement, it may follow a predetermined behavior; 3) if a resource for interference measurement based on NZP CSI-RS is configured and if pairs of NZP CSI-RS are configured, the pairs of NZP CSI-RS may be used for interference measurement by the UE 510 under the assumption that they are both used for transmission as interference (the UE 510 may assume that a pair of NZP-CSI-RS resources for interference measurement are QCLed with a pair of NZP-CSI-RS resources for channel measurement when computing CSI feedback); 4) for each measurement, an association between a resource setting for channel measurement and a resource setting for interference measurement (CSI-IM, NZP CSI-RS) may follow a predetermined behavior}; B) a pair of CSI-RS resources for channel measurement and interference measurement may be introduced in CSI-ResourceConfig; C) CSI-ReportConfig may be updated quickly with MAC CE (this may be important for updating a CSI configuration for channel measurement); C) joint PMI1 & PMI2 may be computed based on a pair of CSI-RS resources for channel measurement; and/or D) in CSI feedback: {1) both PMI1 and PMI2 may be included in a CSI feedback in place of PMI or i1 (e.g., i1 may refer to a subset of indicators from a larger set of indicators—a first index out of two indexes); and/or 2) CQI reflects a channel quality if PMI1 and PMI2 are used}.

In some embodiments, if a gNB receives a CSI report from the UE 510, the gNB may schedule PDSCH transmission scheme according to the first embodiment or the second embodiment based on CSI feedback.

Figure 6:
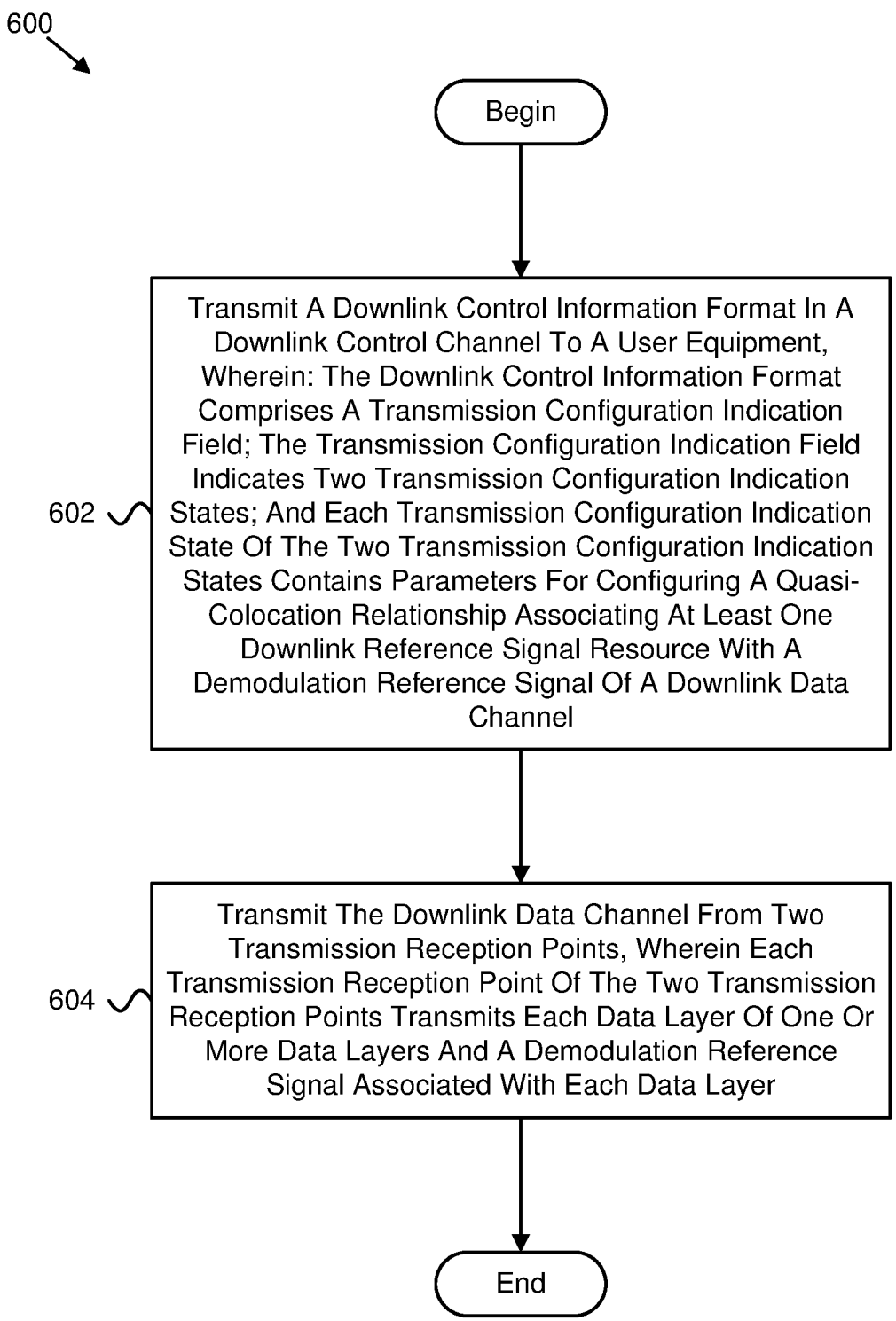
FIG. 6 is a schematic flow chart diagram illustrating one embodiment of a method for data transmissions using multiple transmission reception points.

FIG. 6 is a schematic flow chart diagram illustrating one embodiment of a method 600 for data transmissions using multiple transmission reception points. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource (e.g., CSI-RS or SSB) with a demodulation reference signal of a downlink data channel. In certain embodiments, the method 600 includes transmitting 604 the downlink data channel from two transmission reception points, wherein each transmission reception point of the two transmission reception points transmits each data layer of one or more data layers and a demodulation reference signal associated with each data layer.

In certain embodiments, each demodulation reference signal port in the downlink data channel is associated with the two transmission configuration indication states. In some embodiments, the demodulation reference signal associated with each data layer is associated with two different channel state information reference signal resources.

Figure 7:
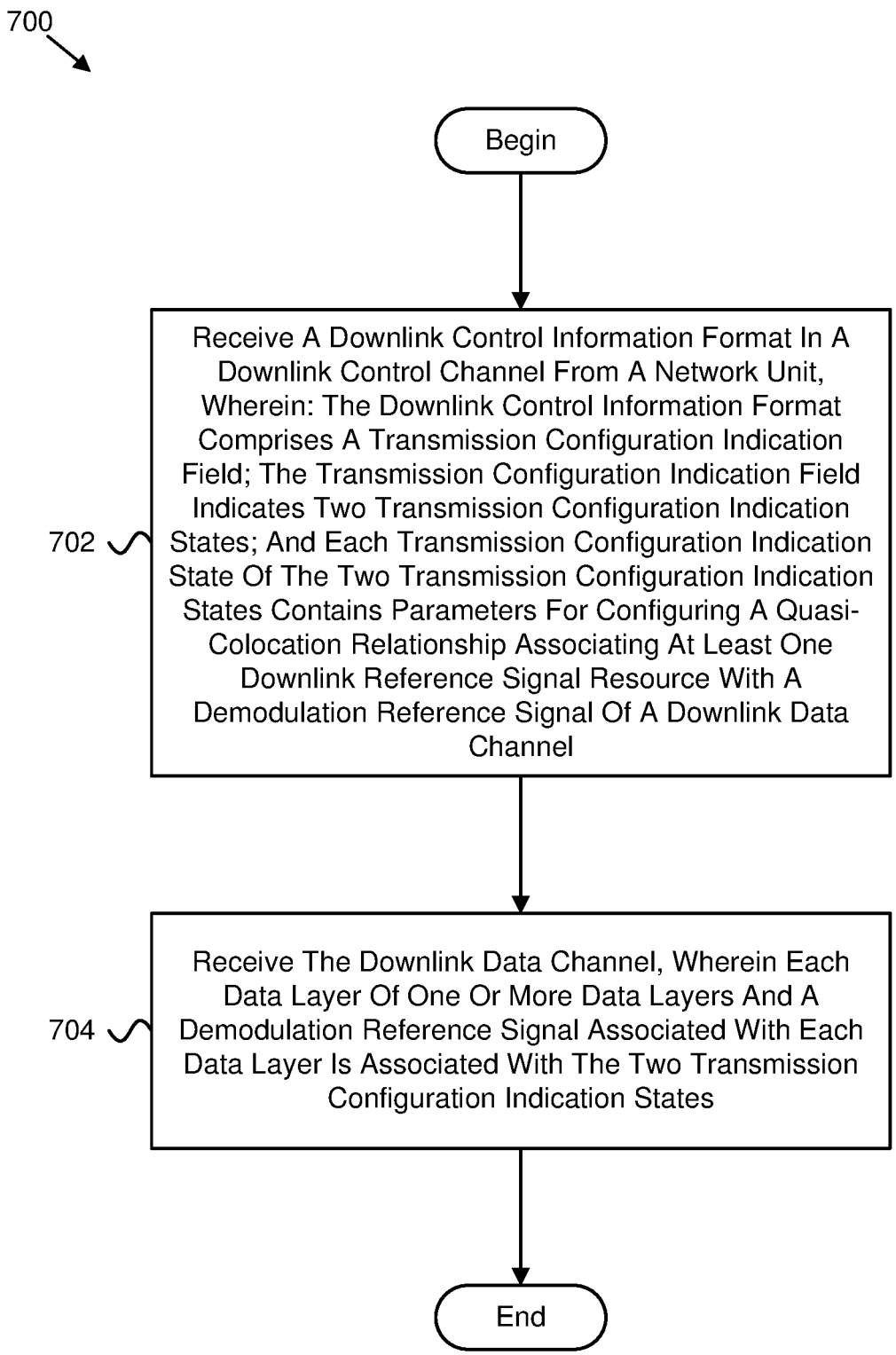
FIG. 7 is a schematic flow chart diagram illustrating another embodiment of a method for data transmissions using multiple transmission reception points.

FIG. 7 is a schematic flow chart diagram illustrating one embodiment of a method 700 for data transmissions using multiple transmission reception points. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource (e.g., CSI-RS or SSB) with a demodulation reference signal of a downlink data channel. In some embodiments, the method 700 includes receiving 704 the downlink data channel, wherein each data layer of one or more data layers and a demodulation reference signal associated with each data layer is associated with the two transmission configuration indication states.

In certain embodiments, each demodulation reference signal port in the downlink data channel is associated with the two transmission configuration indication states. In some embodiments, the demodulation reference signal associated with each data layer is associated with two different downlink reference signal resources.

In one embodiment, a method comprises: transmitting a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and transmitting the downlink data channel from two transmission reception points, wherein each transmission reception point of the two transmission reception points transmits each data layer of one or more data layers and a demodulation reference signal associated with each data layer.

In certain embodiments, each demodulation reference signal port in the downlink data channel is associated with the two transmission configuration indication states.

In some embodiments, the demodulation reference signal associated with each data layer is associated with two different downlink reference signal resources.

In one embodiment, an apparatus comprises: a transmitter that: transmits a downlink control information format in a downlink control channel to a user equipment, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and transmits the downlink data channel from two transmission reception points, wherein each transmission reception point of the two transmission reception points transmits each data layer of one or more data layers and a demodulation reference signal associated with each data layer.

In certain embodiments, each demodulation reference signal port in the downlink data channel is associated with the two transmission configuration indication states.

In some embodiments, the demodulation reference signal associated with each data layer is associated with two different downlink reference signal resources.

In one embodiment, a method comprises: receiving a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and receiving the downlink data channel, wherein each data layer of one or more data layers and a demodulation reference signal associated with each data layer is associated with the two transmission configuration indication states.

In certain embodiments, each demodulation reference signal port in the downlink data channel is associated with the two transmission configuration indication states.

In some embodiments, the demodulation reference signal associated with each data layer is associated with two different downlink reference signal resources.

In one embodiment, an apparatus comprises: a receiver that: receives a downlink control information format in a downlink control channel from a network unit, wherein: the downlink control information format comprises a transmission configuration indication field; the transmission configuration indication field indicates two transmission configuration indication states; and each transmission configuration indication state of the two transmission configuration indication states contains parameters for configuring a quasi-colocation relationship associating at least one downlink reference signal resource with a demodulation reference signal of a downlink data channel; and receives the downlink data channel, wherein each data layer of one or more data layers and a demodulation reference signal associated with each data layer is associated with the two transmission configuration indication states.

In certain embodiments, each demodulation reference signal port in the downlink data channel is associated with the two transmission configuration indication states.

In some embodiments, the demodulation reference signal associated with each data layer is associated with two different downlink reference signal resources.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
　transmitting a downlink control information format in a downlink control channel to a user equipment, wherein:
　　the downlink control information format comprises a transmission configuration indication field;
　　the transmission configuration indication field indicates two transmission configuration indication states; and
　　each transmission configuration indication state of the two transmission configuration indication states contains parameters for configuring a quasi-colocation relationship associating at least one downlink reference signal resource with a demodulation reference signal of a number of demodulation reference signals associated with a downlink data channel; and
　transmitting the downlink data channel from two transmission reception points, wherein:
　　a first transmission reception point of the two transmission reception points transmits each data layer of a plurality of data layers;
　　a second transmission reception point of the two transmission reception points transmits each data layer of the plurality of data layers; and
　　each transmission reception point of the two transmission reception points transmits a demodulation reference signal associated with each data layer of the plurality of data layers, the demodulation reference signal comprising a demodulation reference signal of the number of demodulation reference signals, and the demodulation reference signal of each data layer of the plurality of data layers is associated with two channel state information reference signal (CSI-RS) resources.

2. The method of claim 1, wherein each demodulation reference signal port in the downlink data channel is associated with the two transmission configuration indication states.

3. The method of claim 1, wherein the demodulation reference signal associated with each data layer is associated with two different downlink reference signal resources.

4. A base station, comprising:
　at least one memory; and
　at least one processor coupled with the at least one memory and configured to cause the base station to:
　　transmit a downlink control information format in a downlink control channel to a user equipment, wherein:
　　　the downlink control information format comprises a transmission configuration indication field;
　　　the transmission configuration indication field indicates two transmission configuration indication states; and
　　　each transmission configuration indication state of the two transmission configuration indication states contains parameters for configuring a quasi-colocation relationship associating at least one downlink reference signal resource with a demodulation reference signal of a number of demodulation reference signals associated with a downlink data channel; and
　　transmit the downlink data channel from two transmission reception points, wherein:
　　　a first transmission reception point of the two transmission reception points transmits each data layer of a plurality of data layers;
　　　a second transmission reception point of the two transmission reception points transmits each data layer of the plurality of data layers; and
　　　each transmission reception point of the two transmission reception points transmits a demodulation reference signal associated with each data layer of the plurality of data layers, the demodulation reference signal comprising a demodulation reference signal of the number of demodulation reference signals, and the demodulation reference signal of each data layer of the plurality of data layers is associated with two channel state information reference signal (CSI-RS) resources.

5. The base station of claim 4, wherein each demodulation reference signal port in the downlink data channel is associated with the two transmission configuration indication states.

6. The base station of claim 4, wherein the demodulation reference signal associated with each data layer is associated with two different downlink reference signal resources.

7. A user equipment (UE), comprising:
at least one memory; and
at least one processor coupled with the at least one memory and configured to cause the UE to:
  receive a downlink control information format in a downlink control channel from a network unit, wherein:
    the downlink control information format comprises a transmission configuration indication field;
    the transmission configuration indication field indicates two transmission configuration indication states; and
    each transmission configuration indication state of the two transmission configuration indication states contains parameters for configuring a quasi-colocation relationship associating at least one downlink reference signal resource with a demodulation reference signal of a number of demodulation reference signals associated with a downlink data channel; and
  receive the downlink data channel from two transmission reception points, wherein:
    the UE receives each data layer of a plurality of data layers from a first transmission reception point of the two transmission reception points;
    the UE receives each data layer of one or more the plurality of data layers from a second transmission reception point of the two transmission reception points; and
    each data layer of the plurality of data layers and a demodulation reference signal of the number of demodulation reference signals is associated with each data layer of the plurality of data layers and with the two transmission configuration indication states, and the demodulation reference signal of each data layer of the plurality of data layers is associated with two channel state information reference signal (CSI-RS) resources.

8. The UE of claim 7, wherein each demodulation reference signal port in the downlink data channel is associated with the two transmission configuration indication states.

9. The UE of claim 7, wherein the demodulation reference signal associated with each data layer is associated with two different downlink reference signal resources.

* * * * *